(12) United States Patent
Mehrotra et al.

(10) Patent No.: US 7,345,681 B2
(45) Date of Patent: Mar. 18, 2008

(54) PEN DATA CAPTURE AND INJECTION

(75) Inventors: Sumit Mehrotra, Bellevue, WA (US); Michael H Tsang, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 635 days.

(21) Appl. No.: 10/778,346

(22) Filed: Feb. 17, 2004

(65) Prior Publication Data

US 2005/0179674 A1 Aug. 18, 2005

(51) Int. Cl.
  *G06F 3/33* (2006.01)
  *G06F 3/41* (2006.01)
  *G06K 11/06* (2006.01)

(52) U.S. Cl. .................. 345/179; 382/186; 178/18.01; 715/541

(58) Field of Classification Search ........ 345/156–184; 713/182; 382/181–189; 178/18.01, 18.03; 715/541
See application file for complete search history.

(56) References Cited

U.S. PATENT DOCUMENTS

| | | | | |
|---|---|---|---|---|
| 5,157,384 A | * | 10/1992 | Greanias et al. | 345/156 |
| 5,252,951 A | * | 10/1993 | Tannenbaum et al. | 345/156 |
| 5,875,256 A | * | 2/1999 | Brown et al. | 382/186 |
| 5,898,422 A | * | 4/1999 | Zetts | 345/179 |
| 5,903,668 A | * | 5/1999 | Beernink | 382/187 |
| 7,113,173 B1 | * | 9/2006 | Bi et al. | 345/169 |
| 2006/0143466 A1 | * | 6/2006 | Muller et al. | 713/182 |

* cited by examiner

*Primary Examiner*—David L. Lewis
(74) *Attorney, Agent, or Firm*—Birch, Stewart, Kolasch & Birch, LLP

(57) ABSTRACT

A tool that allows a user, such as a software developer, to create test data that can consistently be employed to simulate the operation of a hardware pen or stylus. Raw pen data, such as position coordinates, pen angle and pen properties, is captured. This data is then later injected into a system being tested in place of pen data from a device driver. The raw pen data may be captured through an application programming interface invoked by a host application. The captured data can then subsequently be injected through another application programming interface invoked by a host application, such as a software testing application for testing a variety of operations of another software application. Alternately, a stand-alone utility may be used for capturing and then injecting raw pen data.

13 Claims, 11 Drawing Sheets

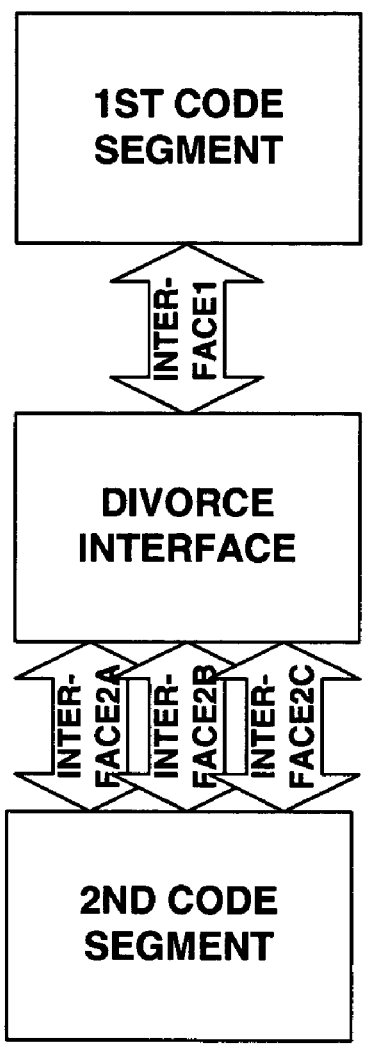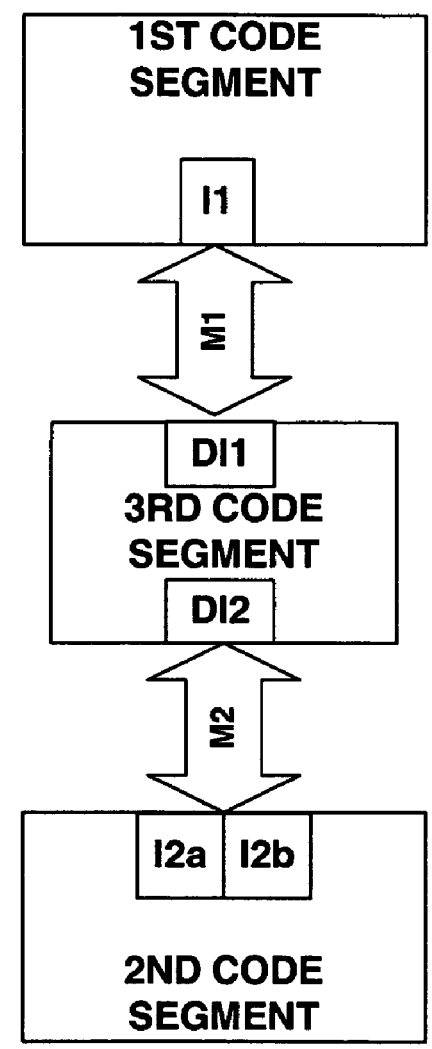
FIGURE 14
FIGURE 15

PEN DATA CAPTURE AND INJECTION

FIELD OF THE INVENTION

The present invention relates to techniques for capturing and injecting pen or stylus data. Various aspects of the present invention are particularly applicable to the testing of software applications or controls by capturing test pen data and subsequently injecting the captured test pen data into a software application or control being tested.

BACKGROUND OF THE INVENTION

Computing devices which allow a user to enter data with a stylus are becoming more and more popular. This type of computing device, which includes personal digital assistants and tablet personal computers, often allow a user to enter data by writing on a surface with a stylus to create electronic ink. The user moves the pen or stylus over a digitizing surface, and an underlying ink-enabled software platform converts the physical movement of the pen into ink strokes and eventually into groupings of handwritten words or drawings. Electronic ink is particularly convenient for users who cannot type quickly with a keyboard, or when the use of a keyboard is impractical.

While ink-enabled platforms and corresponding ink-aware software applications and controls are becoming more common, it is difficult to efficiently test these platforms and such ink-aware applications and controls. "Writing" electronic ink is an inherently manual process, and the features of electronic ink are highly dependent on the individual writing the ink. Because no two users have the same handwriting, no two users running the exact same test can expect the same response from a platform, application or control. This discrepancy is particularly true for applications that recognize text using handwriting recognition.

For example, a software developer may want to test how well a text input panel or "TIP" (i.e., a stand-alone user interface for receiving electronic ink, converting the electronic ink into typewritten text and then inserting the text into a target application) operates with an application. In order to test the text input panel, the developer would need to (1) launch the application, (2) launch the text input panel, (3) switch to a control that will accept input from a stylus, (4) write the desired text electronic ink, (5) activate a command to recognize and insert the text into the application, and (6) verify that the proper typewritten text was accurately inserted into the application.

Each of steps (1)-(3) and (5)-(6) are straightforward, and testing automation processes are well known to execute each of these steps. Step (4), however, can be time consuming if manually performed, especially if the software developer wishes to execute multiple (e.g., more than 1,000) tests with multiple runs of the test pass. Further, if the tester wished to run different variations of the same test, such as, for example, writing the electronic ink at a 45° angle, writing the electronic ink smaller or larger, or writing the electronic more quickly or more slowly, then the user would need to repeat step (4) even more often.

In order to make the testing of ink enabled platforms and ink-aware applications and controls more efficient and reproducible, it would be desirable to automate the process of creating electronic ink. In this manner, the same electronic ink can be created for testing again and again. One such technique for consistently recreating electronic ink is to mount the pen or stylus on an electromechanical device, and then control the device to mimic the user's actions. While this approach will consistently recreate electronic ink, it is relatively slow, difficult to employ, and resource intensive.

Another technique that can be employed is to introduce electronic ink data directly into the platform, application or control being tested. Software developers conventionally implement this technique by placing automation hooks in the specific layers of the software system to be tested. With this approach, however, the electronic ink data must be submitted in the particular format expected at that layer of the system. This can be difficult to implement, and the data format is specific to the layer at which it is used. That is, the data cannot later be employed to test a software platform, application, or control through a different system layer. Accordingly, it would be beneficial to allow a variety of software platforms, applications or controls to be tested using data that can easily and consistently be reproduced.

BRIEF SUMMARY OF THE INVENTION

Advantageously, various examples of the invention allow a user, such as a software developer, to create test data that can consistently be employed to simulate the operation of a hardware pen or stylus. Moreover, these examples of the invention allow the data to be used to test a variety of different types of software platforms, applications and controls (hereafter collectively referred to as software objects for simplicity and convenience). With various implementations of the invention, raw pen data, such as position coordinates, pen angle and pen properties, are captured. This raw pen data is then later injected into a system being tested in place of pen data from a device driver. With some implementations of the invention, the raw pen data may be captured through an application programming interface invoked by a host application, such as a test software application for testing other software applications. The captured data can then subsequently be injected through another application programming interface invoked by the test application. Still other implementations of the invention may employ a special purpose tool for capturing and then injecting raw pen data.

BRIEF DESCRIPTION OF THE DRAWINGS

FIGS. 6-17 illustrate various examples of the operation of application programming interfaces.

DETAILED DESCRIPTION OF THE INVENTION

Example Operating Embodiment

Figure 1:
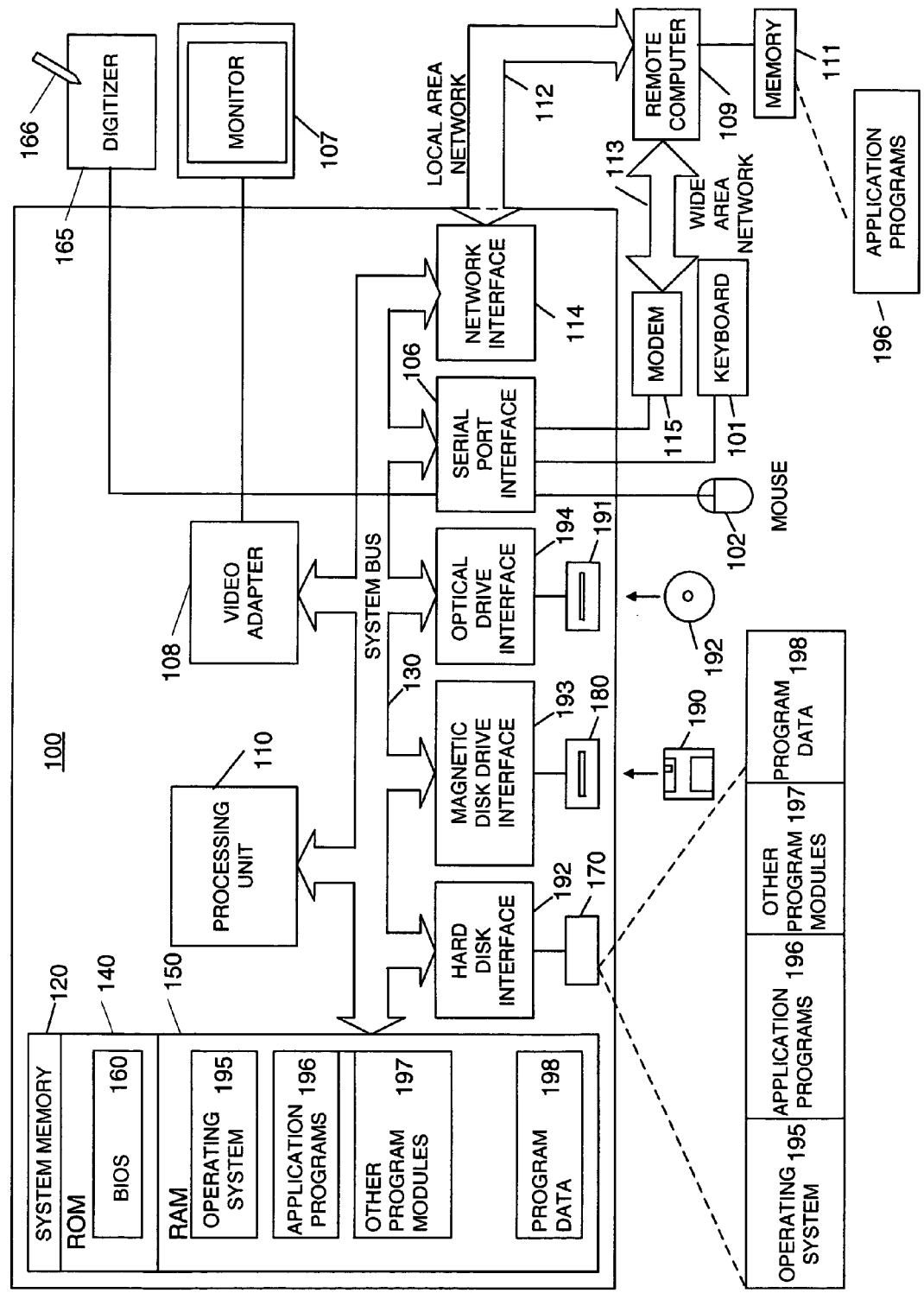
FIGS. 1 and 2 illustrate a computing environment in which various examples of the invention may be implemented.

FIG. 1 illustrates a schematic diagram of a general-purpose digital computing environment that can be used to implement various aspects of the present invention. In FIG.

1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
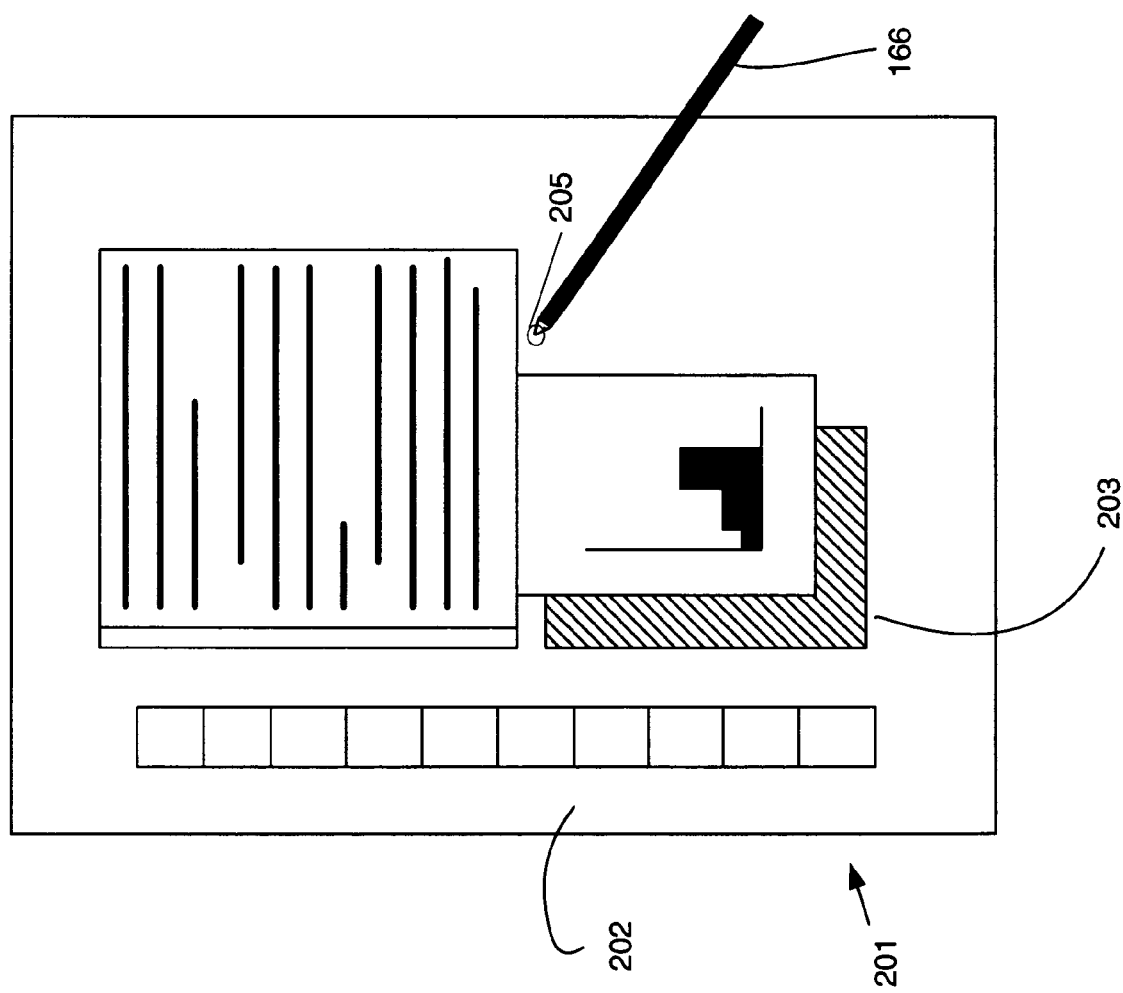

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, and touch-sensitive digitizers may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

Pen Data Capture And Injection Application Programming Interfaces

Figure 3:
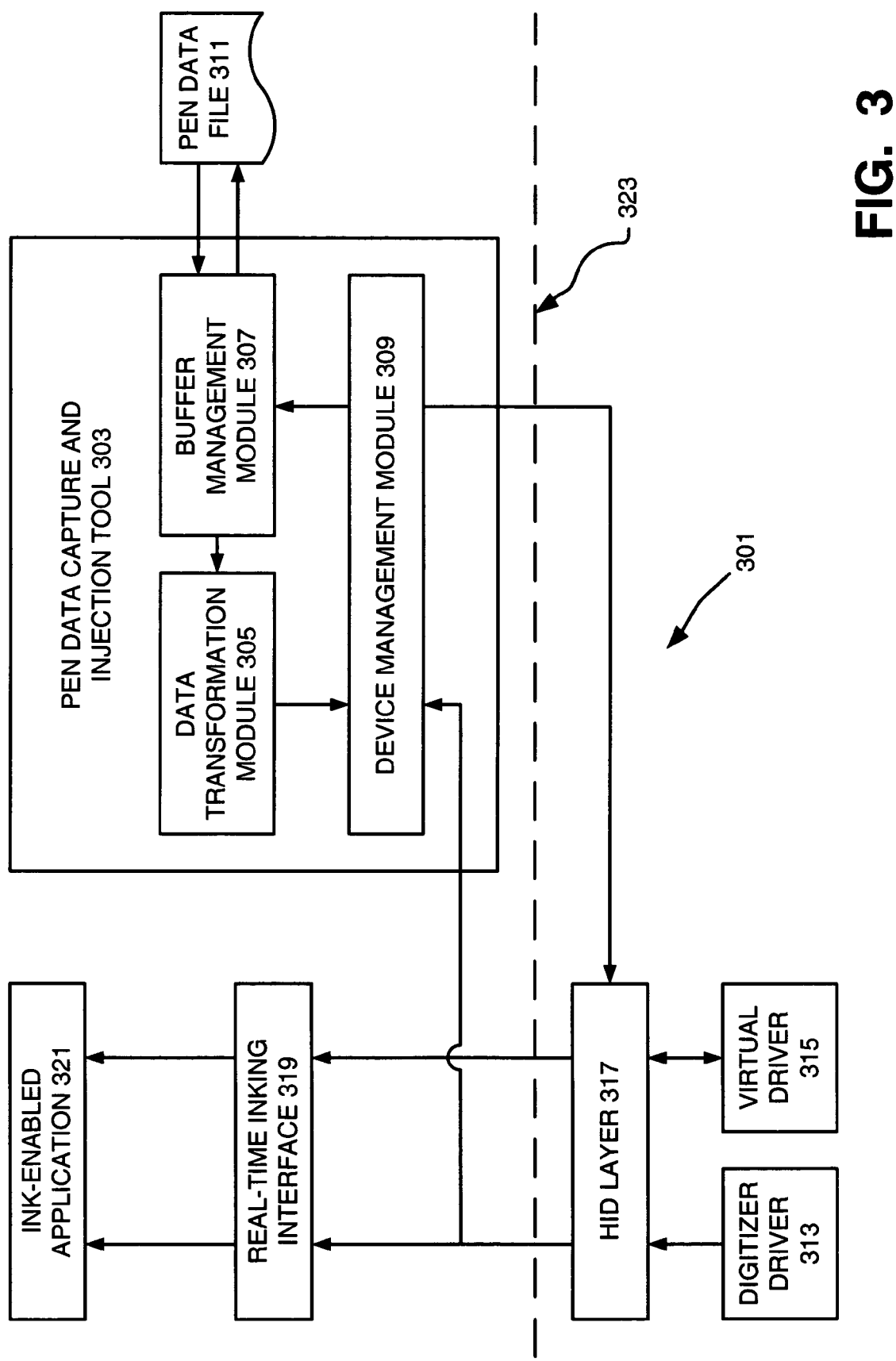
FIG. 3 illustrates an example of a computing system employing application programming interfaces for pen data capture and injection according to various embodiments of the invention.

FIG. 3 illustrates a computing system 301 employing a pen data capture and injection tool 303 that may be implemented according to various embodiments of the invention. As seen in this figure, the tool 303 includes a data transformation module 305, a buffer management module 307, and a device management module 309. Together, these modules cooperate to create and employ a pen data file 311. The tool 303 may be employed in a system 301 that also includes a digitizer driver 313, a virtual driver 315, a human interface device layer 317, a real-time inking interface 319, and an ink-enabled application 321. A dotted line 323 separates the components of the system 301. The components that are typically executed in the operating kernel of a host computer are shown below the dotted line 323, while those components typically executed in applications are shown above the dotted line 323.

When a user moves a stylus or pen 166 across the surface of the digitizer 165 (and, with some digitizers, above the surface of the digitizer 165), the digitizer driver 313 will create raw pen data. This raw pen data may include, for example, the position coordinate of the tip of the pen 166 relative to a coordinate axis for the digitizer 165. This raw pen data may also include the pressure with which the pen 166 presses against the surface of the digitizer 165, the status of the one or more command buttons on the pen 166, and the tilt of the pen 166. In a conventional implementation, the digitizer driver 313 provides this raw data to the human interface device layer 317, which is responsible for managing data generated by various input devices. For example, the human interface device layer 317 may manage data generated by various pointing devices, including a mouse, touchpad, trackball, or joystick. The human interface device 317 may also manage data generated by other human interface device compliant input devices, such as a keyboard or keypad.

The human interface device layer 317 then provides the pen data to the real-time inking interface 319, which converts the pen data into electronic ink data. For example, the real-time inking interface 319 may create electronic ink strokes that correspond to sequentially detected coordinate positions of the pen 166. The real-time inking interface 319 then provides the electronic ink to the ink-enabled application 321, which treats the electronic ink as input data. Together, the human interface device layer 317, the real-time inking interface 319 and the ink-enabled application 321 (as well as any other intermediate software objects) form a "stack" of software objects. As will now be explained in more detail, the pen data capture and injection tool 303 captures raw pen data from the digitizer driver 313, and then subsequently injects the raw pen data into the bottom of the stack through the human interface device layer 317 and the virtual driver 315.

Figure 4:
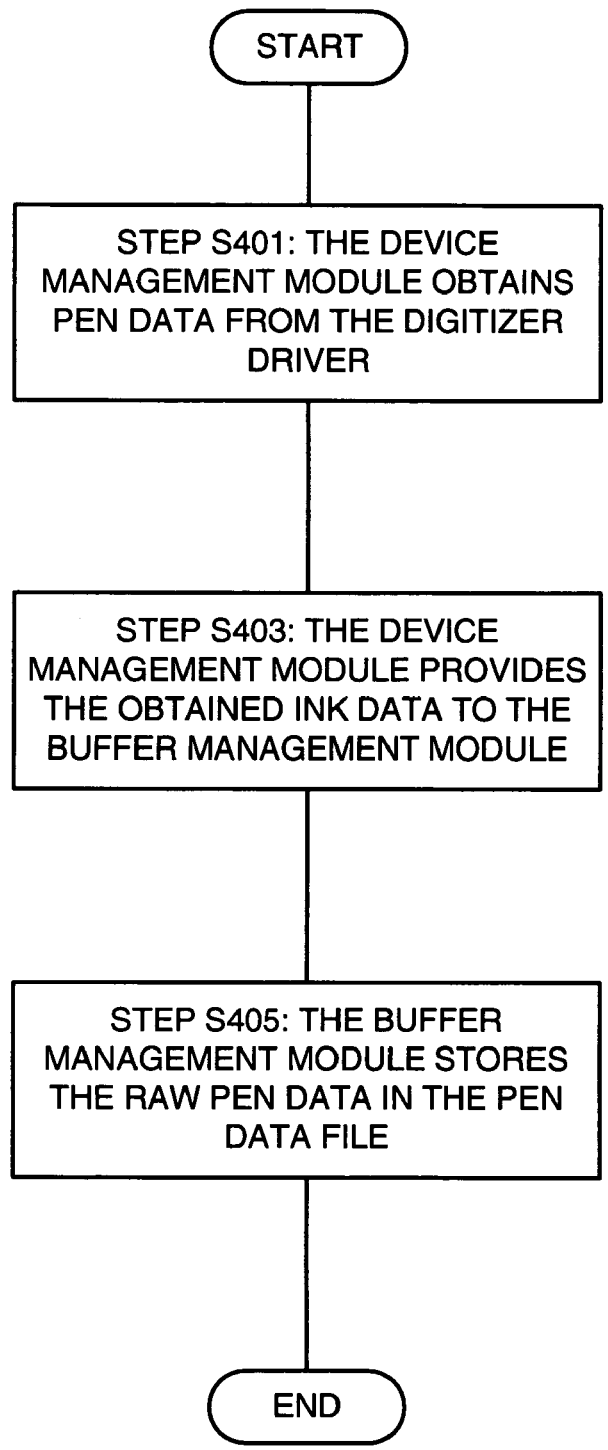
FIG. 4 illustrates a flowchart describing a process of capturing pen data according to various embodiments of the invention.
Figure 5A:
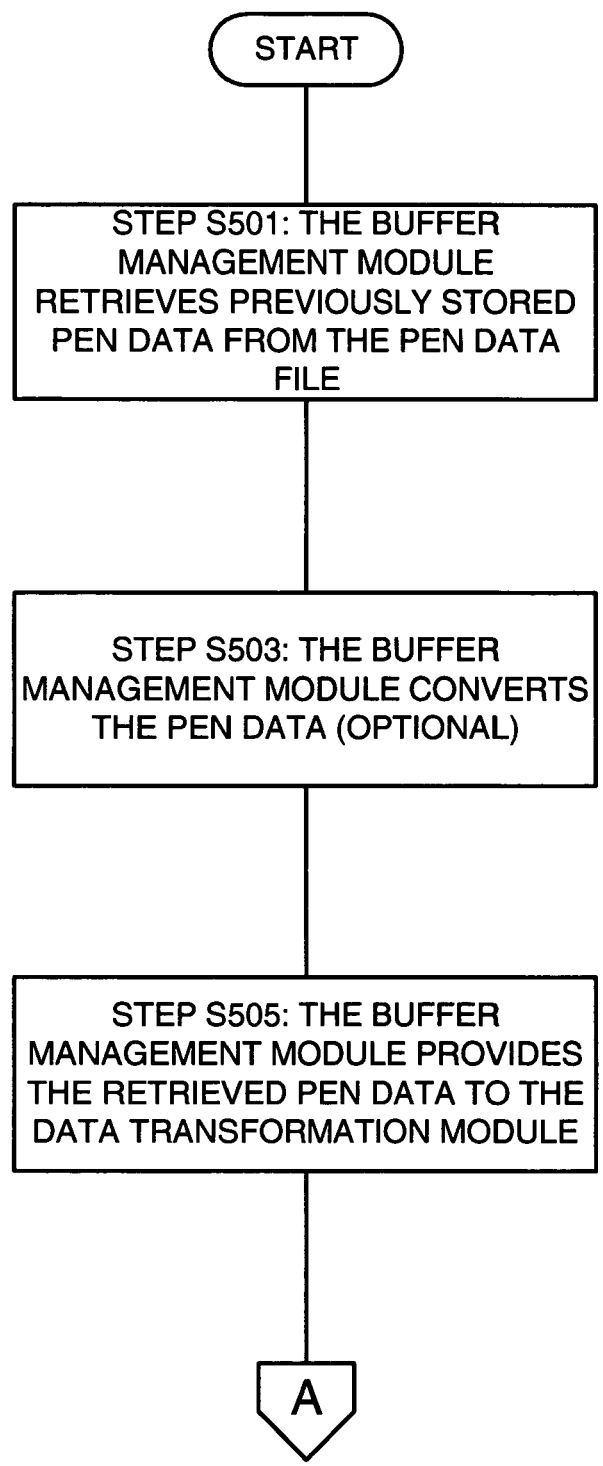
FIGS. 5A and 5B together illustrate a flowchart describing a process of injecting pen data according to various embodiments of the invention.
Figure 5B:
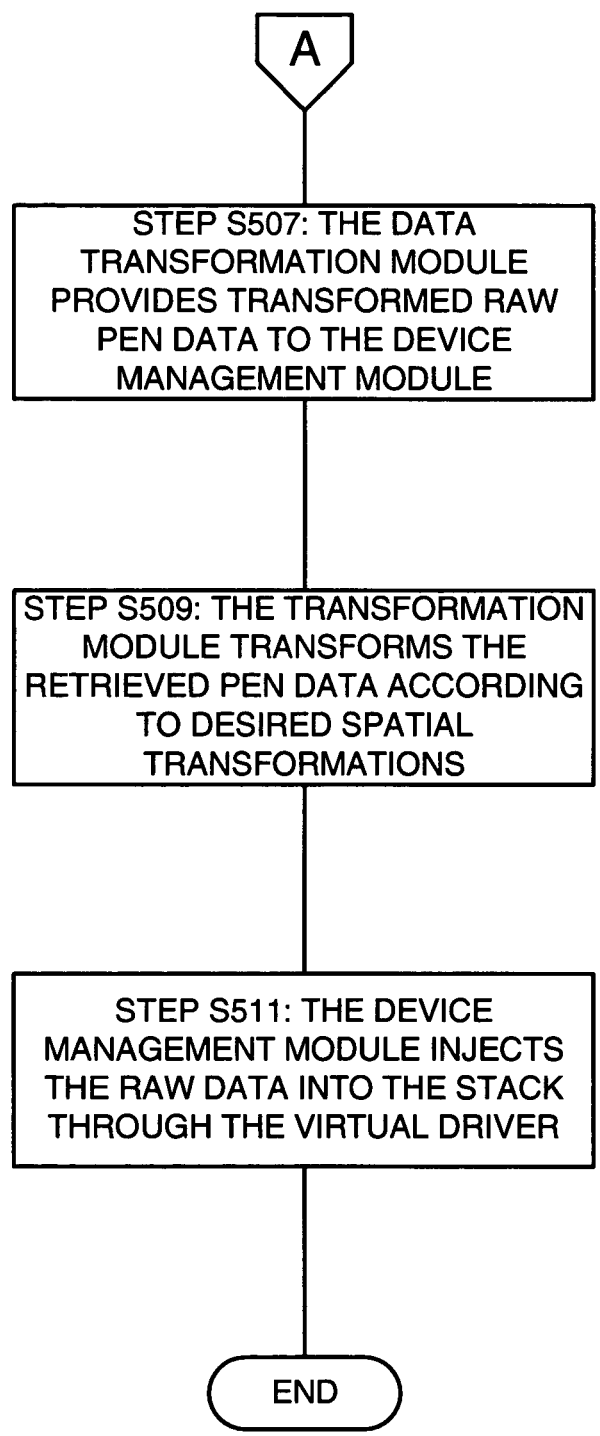

The pen data capture and injection tool 303 has two operational modes: a capture mode and an injection mode. These modes will now be discussed with reference to the flowchart shown in FIGS. 4, 5A and 5B. In the data capture mode, the pen data capture and injection tool 303 captures raw ink data created by moving the stylus 166 against (or, in some embodiments, over) the surface of the digitizer 165. More particularly, in step S401, the device management module 309 obtains raw pen data from the digitizer driver 313 through the human interface device layer 317.

Next, in step S403, the device management module 309 provides the obtained raw ink data to the buffer management module 307. The buffer management module 307 then stores the raw pen data in the pen data file 311 in step S405. The raw ink data may be stored using any convenient file format. For example, the pen data may be stored in a file format specifically configured to store raw ink data. Alternately, the raw pen data may be embedded within a file having another type of file format, such as an extensible markup language (XML) file. In this manner, the pen data capture and injection tool 303 captures raw ink data for future use.

In the injection mode, the pen data capture and injection tool 303 injects the previously captured pen data via the human interface device layer 317 into the bottom of the stack of software objects supporting the ink-enabled application, as previously noted. More particularly, referring to FIGS. 5A and 5B, in step S501, the buffer management module 307 retrieves previously stored pen data from the pen data file 311. It should be noted that various embodiments of the invention may allow the use of a variety of different pen data formats.

For example, the pen data file 311 may be created with a file format specifically configured to store raw pen data. Further, in addition to a file format specifically configured to store raw pen data, the pen data file 311 may be another type of file, such as an XML file, containing embedded raw pen data. Alternately or additionally, the pen data file 311 may inherently store pen data in the form of electronic ink file formats. If such an alternate file format is employed, then the buffer management module 307 will convert the pen data from this alternate data format to raw pen data in step S503.

The buffer management module 307 provides the retrieved pen data to the data transformation module 305 in step S505. The transformation module 305 then transforms the retrieved pen data according to desired spatial transformations in step S507. For example, the transformation module 305 may rotate the angle of the pen data (so that, e.g., the direction of electronic ink generated from the pen data is angled). The transformation module 305 may also change the scale of the pen data (so that, e.g., the size of electronic ink generated from the pen data changes), and the speed at which the pen data is injected into the software stack. The data transformation module 305 then provides the transformed raw pen data to the device management module 309 in step S509.

In step S511, the device management module 309 injects the raw data into the stack through the human interface device layer 317 and the virtual driver 315. As previously noted, the virtual driver 315 is managed by the operating kernel of the computer hosting the ink-enabled application 321, which enables the pen data capture and injection tool 303 to pump raw pen data into the stack of software objects at its lowermost layer. The virtual driver 315 is similar to the digitizer driver 313, but the virtual driver 315 does not require a physical digitizer to function. Further, the virtual driver 315 can accept data from external sources other than a physical pen 165 (e.g., the device management module 309 of the tool 303).

Implementation of the Pen Data Capture and Injection Application Tool

Various embodiments of the tool 303 may be implemented as part of a testing software application being used to test the ink-enabled application 321. More particularly, various embodiments of the tool 303 may be implemented using application programming interfaces invoked by a testing software application configured to test one or more operations of the ink-enabled application 321.

An application programming interface (or more simply, a programming interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 6:
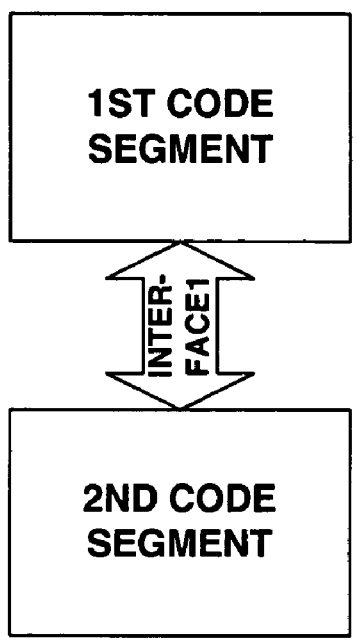
Figure 7:
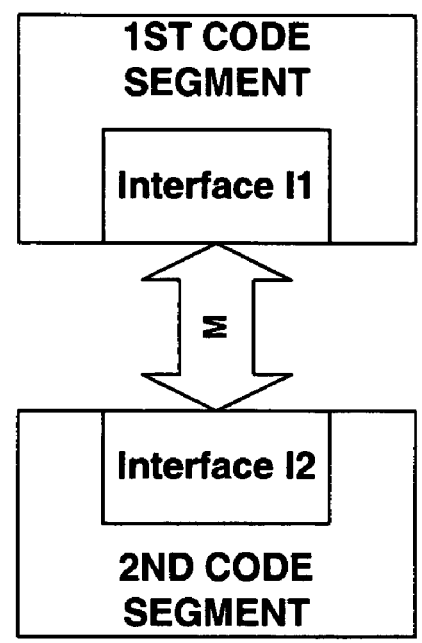

Notionally, a programming interface may be viewed generically, as shown in FIG. 6 or FIG. 7. FIG. 6 illustrates an interface Interface1 as a conduit through which first and second code segments communicate. FIG. 7 illustrates an interface as comprising interface objects I1 and I2 (which may or may not be part of the first and second code segments), which enable first and second code segments of a system to communicate via medium M. In the view of FIG. 7, one may consider interface objects I1 and I2 as separate interfaces of the same system and one may also consider that objects I1 and I2 plus medium M comprise the interface.

Although FIGS. 6 and 7 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 6 and 7, but they nonetheless perform a similar function to accomplish the same overall result. Some illustrative alternative implementations of a programming interface will now briefly be described.

A. Factoring

Figure 8:
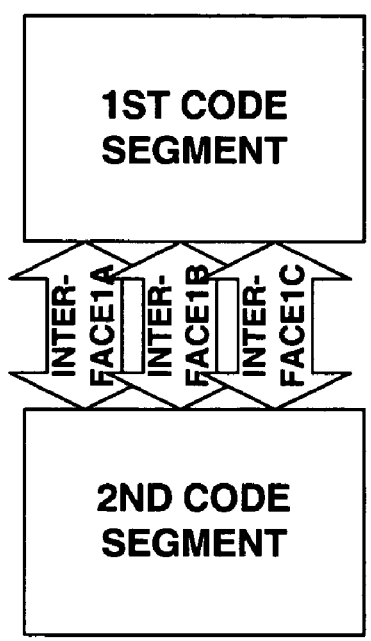
Figure 9:
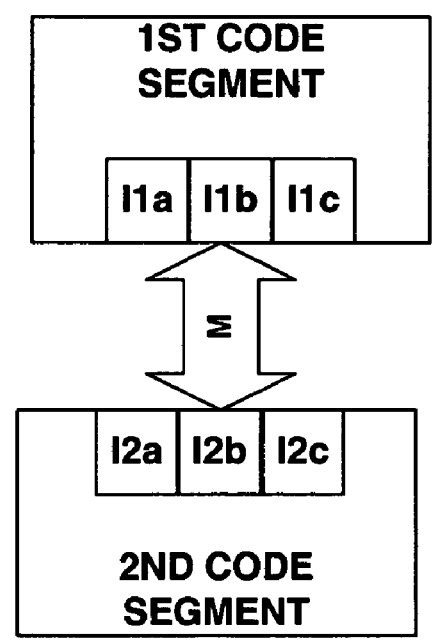

A communication from one code segment to another may be accomplished indirectly by breaking the communication into multiple discrete communications. This is depicted schematically in FIGS. 8 and 9. As shown, some interfaces can be described in terms of divisible sets of functionality. Thus, the interface functionality of FIGS. 8 and 9 may be factored to achieve the same result, just as one may mathematically provide 24, or 2 times 2 time 3 times 2. Accordingly, as illustrated in FIG. 8, the function provided by interface Interface1 may be subdivided to convert the communications of the interface into multiple interfaces Interface1A, Interface 1B, Interface 1C, etc. while achieving the same result. As illustrated in FIG. 9, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc.

When factoring, the number of interfaces included with the $1^{st}$ code segment need not match the number of interfaces included with the $2^{nd}$ code segment. In either of the cases of FIGS. 8 and 9, the functional spirit of interfaces Interface1 and I1 remain the same as with FIGS. 6 and 7, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 10:
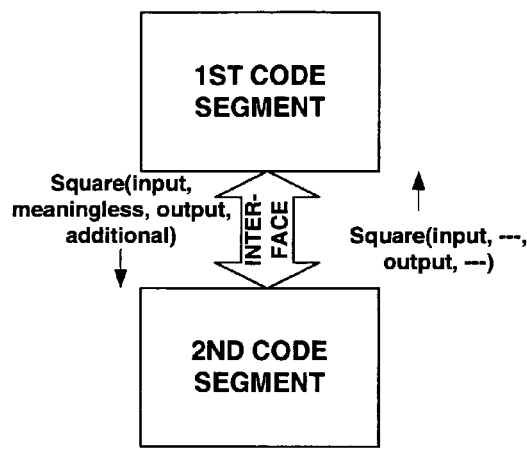
Figure 11:
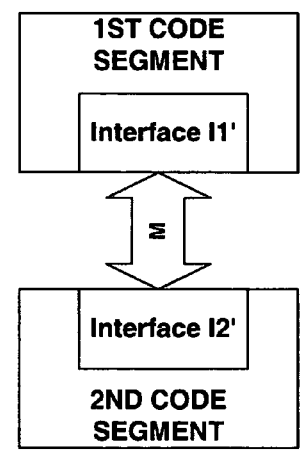

In some cases, it may be possible to ignore, add or redefine certain aspects (e.g., parameters) of a programming interface while still accomplishing the intended result. This is illustrated in FIGS. 10 and 11. For example, assume interface Interface1 of FIG. 6 includes a function call Square (input, precision, output), a call that includes three parameters, input, precision and output, and which is issued from the 1st Code Segment to the 2nd Code Segment. If the middle parameter precision is of no concern in a given scenario, as shown in FIG. 10, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 11, interface I1 is replaced by interface I1', redefined to ignore or add parameters to the interface. Interface I2 may similarly be redefined as interface I2', redefined to ignore unnecessary parameters, or parameters that may be processed elsewhere. In other words, in some cases a programming interface may include aspects, such as parameters, which are not needed for some purpose, and so they may be ignored or redefined, or processed elsewhere for other purposes.

C. Inline Coding

Figure 12:
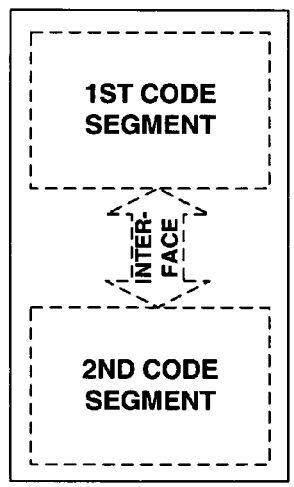
Figure 13:
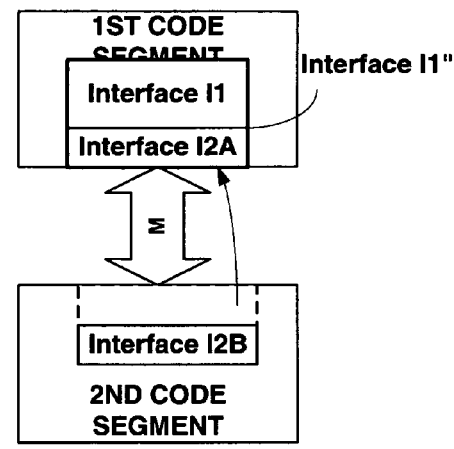

It may also be feasible to merge some or all of the functionality of two separate code modules such that the "interface" between them changes form. For example, the functionality of FIGS. 6 and 7 may be converted to the functionality of FIGS. 12 and 13, respectively. In FIG. 12, the previous $1^{st}$ and $2^{nd}$ Code Segments of FIG. 6 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, as shown in FIG. 13, part (or all) of interface I2 from FIG. 7 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 7 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. 14 and 15. As shown in FIG. 14, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible.

Similarly, as shown in FIG. 15, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 7 to a new operating system, while providing the same or similar functional result.

E. Rewriting

Figure 16:
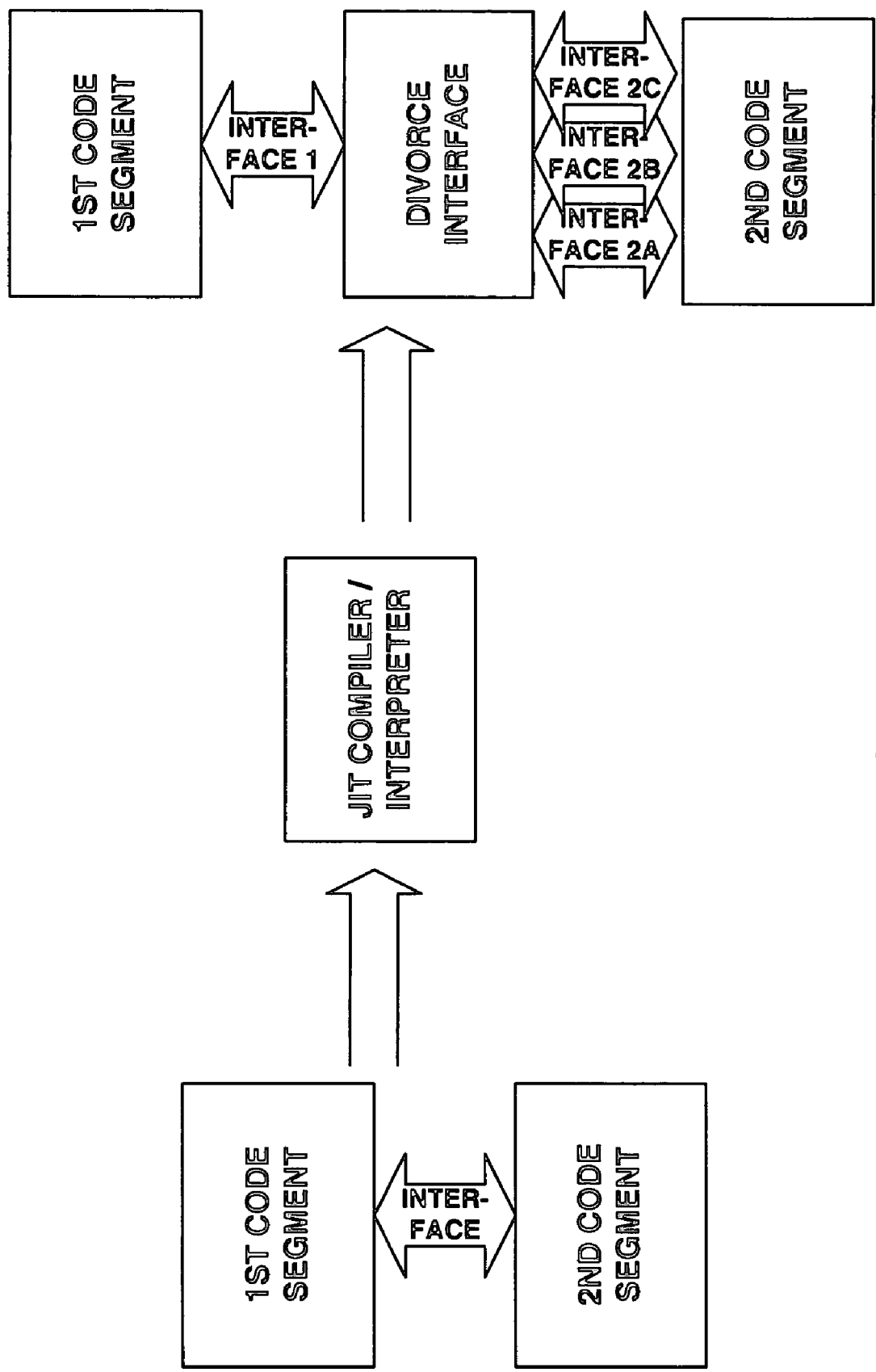
Figure 17:
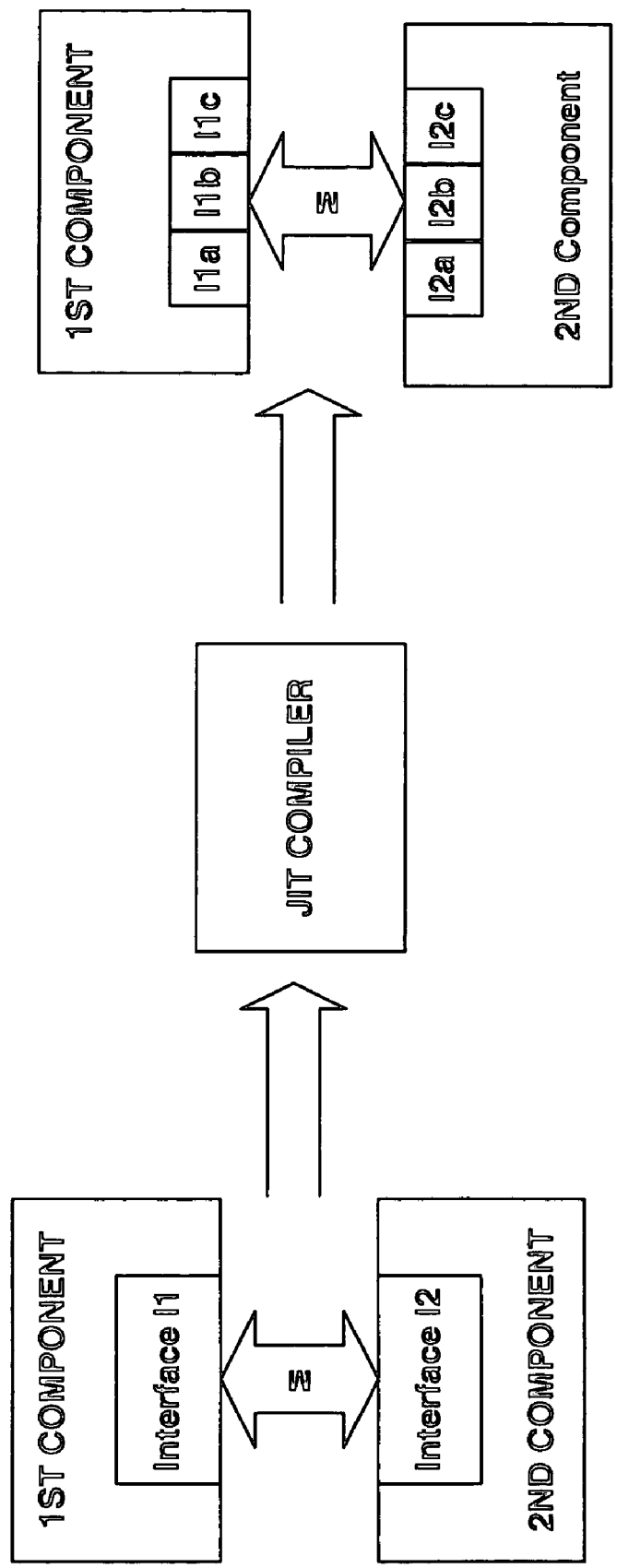

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 16 and 17. As can be seen in FIG. 16, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 17, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 6 and 7. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Returning now to the particular discussion of the tool 303, various embodiments of the invention may provide a CapturePenEvent( ) application programming interface, which enables the data capture and storage of raw pen data in any desired file format. As previously noted, with various embodiments of the invention, captured raw pen data may be stored using a file format specifically configured to store pen data, or it may be embedded in a file using another type of file format (such as an XML file). This application programming interface thus may employ a filename argument (e.g., "pszFileName"), which defines the file name for the pen data file 311.

This application programming interface also may employ a mode parameter, defining how the application programming interface will operate. With various embodiments of the invention, for example, the CapturePenEvent( ) application programming interface may operate in a first Capture Stop mode, which defines how the pen data capture process will end, and a second Data Storage mode, which defines how the data will be stored in the pen data file 311. During execution, the CapturePenEvent( ) application programming interface may then return a "success" message after it has successfully captured the designated pen data, an "invalid arguments" message if the arguments passed to the CapturePenEvent( ) application programming interface are not correct, and a "fail" message for any other type of failure. The CapturePenEvent( ) application programming interface may also create a notification event (e.g., "CapturePenEvent") to other software objects upon completing the pen data capture.

Various embodiments of the invention also may provide an InjectPenEventFromFile( ) application programming interface, which injects pen data from a designated file into the software stack. The InjectPenEventFromFile( ) application programming interface may employ a parameter designating the file from which the pen data will be retrieved (e.g., "pszFileName"), and one or more parameters defining how the retrieved pen data will be transformed before being injected into the software stack.

For example, the InjectPenEventFromFile( ) application programming interface may employ parameters defined in a metadata structure for manipulating the retrieved pen data. This metadata structure may thus include a parameter dwDataType, which defines the type data that the application programming interface should expect to retrieve from the data file 311. This parameter may have valid values such as PI_DATA_TYPE_PEN, indicating that pen data will be retreived from the data file 311. With various embodiments of the invention, the data transformation module 305 will only perform transformations for this data type). The value of this parameter may then be set to PI_DATA_TYPE_MOUSE, when, for example, mouse data is being retrieved from the file 311, and may be set to PI_DATA_TYPE_KEYBOARD when keyboard data is being retrieved from the data file 311.

The metadata may also include a parameter dwMode, which defines the stop mode for replaying (or injecting) retrieved pen data. Valid values for this parameter may thus include, for example, PI_INJECT_STOP_PENONLY_MODE, which will cause the pen data replay to stop when all of the retrieved pen data has been replayed or an End( ) method is called to stop the injection process. This parameter may also have the value PI_INJECT_STOP_EVENT_MODE, which will cause the replay of the pen data to stop when a previously created event has been signaled. This event, named, for example, PenEndEvent, should have been already created by the caller of this method, otherwise the method will fail.

Still further, the metadata may include the parameter dwTransform, which defines the type of transformation to be performed on the retrieved pen data. This parameter may include such valid values as PI_TRANSFORM_NONE, which causes no transformations to be performed on the retrieved pen data, PI_TRANSFORM_SCALE, which causes the retrieved pen data to be scaled along one or both axes. If this value is selected, then the metadata will additionally include one or more parameters describing the type of desired scaling, such as a parameter psScaleFactor.

If the scaled retrieved pen data is to be injected at a specifically defined rectangle within a user interface space provided by the ink enabled application 321, then the metadata will also include one or more parameters defining this rectangle. For example, the metadata may include a parameter prcLocation, defining the left top and right bottom of the new rectangle. Similarly, if the pen data is to be injected into a bounding box in the user interface space of the ink-enabled application 321, then the parameter dwTransform may have the value PI_TRANSFORM_BOUNDINGBOX. Again, the metadata may include a parameter prcLocation, defining the bounding box.

If the pen data is to be rotated before it is injected into the user interface space of the ink-enabled application 321, then the dwTransform parameter may have the value PI_TRANSFORM_ROTATE_ORIGIN. This value causes the pen data is to be rotated anticlockwise with the left top of its bounding box as the center. The value of a parameter flRotationAngle may then define the angle of rotation.

If the pen data is to be injected into the user interface space of the ink-enabled application 321 at a desired speed, then the dwTransform parameter may have the value PI_TRANSFORM_TIME. This value causes the retrieved pen data to be replayed faster or slower than the actual speed of its recording. The value of the parameter flTimeScale then defines the factor by which the speed is to be multiplied. A value of 1 is the same speed at which the pen data was captured. If, for example, the value of this parameter. is >1, then the pen data will be injected at a faster speed than the capture speed. Correspondingly, a value between 0 and 1 will cause the pen data to be injected at a speed slower than the capture speed.

During execution, the InjectPenEventFromFile( ) application programming interface may then return a "success" message after it has successfully injected the retrieved pen data, and an "invalid arguments" message if the arguments passed to the InjectPenEventFromFile( ) application programming interface are not correct. The InjectPenEventFromFile( ) application programming interface may also generate an "out of memory" message if some allocation of memory fails, an "access denied" message if some resource being requested by the application programming interface is not present, and a "fail" message for any other type of failure. The InjectPenEventFromFile( ) application programming interface may also create a notification event (e.g., "InjectPenEventFromFile") to other software objects upon completing the injection of the retrieved pen data.

Still further, various embodiments of the invention also may provide an InjectPenEventFromBuffer( ) application programming interface to enable injection of data from a user defined buffer. The InjectPenEventFromBuffer( ) application programming interface may employ, for example, a data buffer parameter (e.g., "pBuffer") defining the data buffer from which it will retrieve pen data. The ( ) application programming interface may also employ a data packet count parameter (e.g., "dwCount") defining the number of data packets that will be retrieved from the buffer, and one or more parameters defining how the retrieved pen data will be transformed before being injected into the software stack.

Like the InjectPenEventFromFile( ) application programming interface, the InjectPenEventFromBuffer( ) application programming interface may return a "success" message after it has successfully injected the retrieved pen data, and an "invalid arguments" message if the arguments passed to the are not correct. The InjectPenEventFromBuffer( ) application programming interface may also generate an "out of memory" message if some allocation of memory fails, an "access denied" message if some resource being requested by the application programming interface is not present, and a "fail" message for any other type of failure. The InjectPenEventFromBuffer( ) application programming interface may also create a notification event (e.g., "InjectPenEventFromBuffer") to other software objects upon completing the injection of the retrieved pen data.

As previously noted, various embodiments of the invention may convert ink data, such as electronic ink data stored in different file formats, into raw pen data for injection. These embodiments of the invention may employ still other application programming interfaces, such as an InjectPenInjectPenEventFrom***File( ) application programming interface to provide the data injection for these ink data formats, respectively.

As noted above, various embodiments of the tool 303 may be implemented within a separate testing application employed by a user, such as a software developer using the tool 303 to test a new software application. With some embodiments the testing application may include functionality to test a variety of operations of the ink-enabled application 321, in addition to the processing of pen data.

With still other embodiments of the invention, however, the tool 303 may be implemented in a testing utility designed solely to test how the ink-enabled application processes pen data. With these embodiments, the user may employ the utility to capture data in a desired file format, transform and inject pen data into the software stack, or both, before using the data in the automation code.

For example, a capture function of the utility may employ a parameter naming the file in which captured data will be stored (e.g., "filename"), while a replay function of the utility may employ a parameter naming the file from which pen data will be retrieved (e.g., "filename"). The replay function of the utility may also employ various parameters specifying how the retrieved pen data will be transformed before it is injected into the software stack. Thus, the replay function may employ parameters defining how the pen data will be scaled in an x-axis direction (e.g., "sx"), scaled in a y-axis direction (e.g., "sy") or both (e.g., "sxy") relative to, for example, a reference point (e.g., a left topmost reference point).

The replay function may also use a parameter defining a bounding box for the retrieved pen data (e.g., "b") by, for example, a left top and right bottom of the bounding box. The replay function may also use a parameter defining a rotational angle for the retrieved pen data (e.g., "r"), and a parameter defining a time multiplication factor for a speed at which the retrieved pen data will be injected into the software stack (e.g., "t"). Thus, a user may input a command Utility replay-f Datafile.***-sxy 2 2 100 100-r 165 into the utility. This command instructs the utility to retrieve pen data from the file Datafile.*** and then inject the retrieved pen data such that it is scaled by a factor of 2 in both the x and y directions, with the left top of its bounding box positioned at screen co-ordinates (100,100) and the entirety of the pen data is rotated by 165° around that point in the anticlockwise direction.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of employing pen data, comprising:
    capturing pen data from a digitizer driver, storing the captured pen data in a pen data file,
    retrieving at least a portion of the captured pen data from the pen data file;
    transforming the pen data differently a defined number of times; and
    injecting the retrieved pen data and each of the transformed pen data into a lowermost layer of a stack of software objects for processing, each injection being performed after processing is completed for the previous injected pen data.

2. The method recited in claim 1, further comprising injecting the retrieved pen data into the lowermost layer of the stack of software objects through a virtual driver.

3. The method recited in claim 1, further comprising transforming the retrieved pen data before injecting the retrieved pen data into the lowermost layer of the stack of software objects.

4. The method recited in claim 3, wherein transforming the retrieved pen data includes rotating the pen data, scaling the pen data, or determining a speed at which the pen data will be injected into the lowermost layer of the stack of software objects.

5. The method recited in claim 1, wherein the stack of software objects includes a human interface device layer, an inking interface, and an ink-enabled application.

6. A method of employing pen data, comprising:
retrieving pen data from a pen data file;
transforming the pen data differently a defined number of times; and
injecting the retrieved pen data into a lowermost layer of a stack of software objects for processing, each injection being performed after processing is completed for the previous injected pen data.

7. The method recited in claim 6, further comprising injecting the retrieved pen data into the lowermost layer of the stack of software objects through a virtual driver.

8. The method recited in claim 6, further comprising retrieving the pen data before injecting the retrieved pen data into the lowermost layer of the stack of software objects.

9. The method recited in claim 8, wherein transforming the retrieved pen data includes rotating the pen data, scaling the pen data, or determining a speed at which the pen data will be injected into the lowermost layer of the stack of software objects.

10. The method recited in claim 6, further comprising
retrieving the pen data from the pen data file as electronic ink data; and
converting the electronic ink data to raw pen data.

11. The method recited in claim 6, wherein the stack of software objects includes a human interface device layer, an inking interface, and an ink-enabled application.

12. A tool for employing pen data, comprising:

a buffer management module that retrieves raw pen data from a pen data file, a data transformation module that designates the parameters used to transform the raw pen data and transforms the retrieved raw pen data into pen data based on the designated parameters before the device management module provides the retrieved pen data to a driver, a device management module that provides the retrieved pen data to a driver, wherein the data transformation module can transform the raw pen data multiple times using different parameters to create multiple different pen data, from the raw pen data, where after each transformation the transformed pen data is provided to said driver.

13. The tool recited in claim 12, wherein the device management module also captures pen data provided by a driver; and the buffer management module stores the captured pen data in a pen data file.

* * * * *